United States Patent [19]

Iwase et al.

[11] 4,147,747
[45] Apr. 3, 1979

[54] METHOD OF MAKING A POLYCRYSTALLINE MN CONTAINING FERRITE BODY

[75] Inventors: Keizo Iwase, Shiga; Toshio Takada, Kyoto; Yoshichika Bando, Takatsuki, all of Japan

[73] Assignee: Matsushita Electric Industrial Co., Ltd., Japan

[21] Appl. No.: 729,972

[22] Filed: Oct. 6, 1976

Related U.S. Application Data

[63] Continuation of Ser. No. 421,925, Dec. 5, 1973, abandoned.

[30] Foreign Application Priority Data

Dec. 11, 1972 [JP] Japan .................. 47-124103

[51] Int. Cl.² ............................................. C04B 35/36
[52] U.S. Cl. ................... 264/65; 252/62.56; 264/332
[58] Field of Search ............ 264/61, 66, 65, 332; 252/62.56

[56] References Cited

U.S. PATENT DOCUMENTS 3,066,103  11/1962  Owen .................. 264/61
3,723,587   3/1973  Iwase et al. ........... 264/61

FOREIGN PATENT DOCUMENTS 50-67489  6/1975  Japan ................ 252/62.56
50-67490  6/1975  Japan ................ 252/62.56
50-78600  6/1975  Japan ................ 252/62.56

Primary Examiner—Robert F. White
Assistant Examiner—John A. Parrish
Attorney, Agent, or Firm—Wenderoth, Lind & Ponack

[57] ABSTRACT

A method of making a polycrystalline Mn containing ferrite body composed of crystallites which have the (111)-crystallographic planes thereof oriented substantially parallel with each other. The method involves providing a manganese compound, forming a body of a mixture made up of the manganese compound and other ferrite constituents, and heating the body made of the mixture into a polycrystalline Mn containing ferrite body of a spinel structure, wherein the manganese compound is in the form of thin platelets which have substantially parallel major surfaces oriented substantially in one direction in the body of the mixture. The ferrite body made thereby is a dense polycrystalline ferrite body having improved resistance to crumbling, improved wear characteristics and suitable physical properties for e.g. magnetic heads.

21 Claims, 5 Drawing Figures

METHOD OF MAKING A POLYCRYSTALLINE MN CONTAINING FERRITE BODY

This is a Continuation of application Ser. No. 421,925, filed Dec. 5, 1973, now abandoned.

This invention relates to a method of making a polycrystalline Mn containing ferrite body of superior mechanical properties and of superior magnetic characteristics, and more particularly to a method of making a polycrystalline Mn containing spinel ferrite body composed of crystallines which have the (111)-crystallographic planes thereof oriented substantially parallel with each other.

Spinel ferrite materials are coming into wider use for magnetic heads of audio equipment and video tape recorders since the operational lives of magnetic heads are improved by the mechanically hard nature of the ferrite materials. When the front surfaces of magnetic heads contact a recording medium which has a rough and hard surface, the front surface of the heads crumbles, and this decreases severely the output of the magnetic heads even though the magnetic heads are made of spinel ferrite materials having a mechanically hard nature. At present, magnetic heads with the even better resistance to crumbling are required to provide even better operational characteristics of audio equipment and video tape recorders.

Accordingly, an object of this invention is to provide a method of making a dense polycrystalline ferrite body having improved resistance to crumbling, improved wear characteristics and more suitable physical properties for e.g. magnetic heads.

This object is achieved according to this invention by a method of making a polycrystalline Mn containing ferrite body, comprising the steps of providing a manganese compound; forming a body of a mixture comprising said manganese compound and ferrite constituents; and heating said body formed from said mixture into a polycrystalline Mn containing ferrite body of a spinel structure, said manganese compound being in the form of thin platelets which have substantially parallel major surfaces, said parallel major surfaces being oriented substantially in one direction in said body of said mixture, whereby said polycrystalline Mn containing ferrite body consists essentially of crystallites which have the (111)-crystallographic planes thereof oriented substantially parallel with each other.

This and other objects and features of this invention will be apparent upon consideration of the following description together with the accompanying drawings, wherein.

Figure 3:
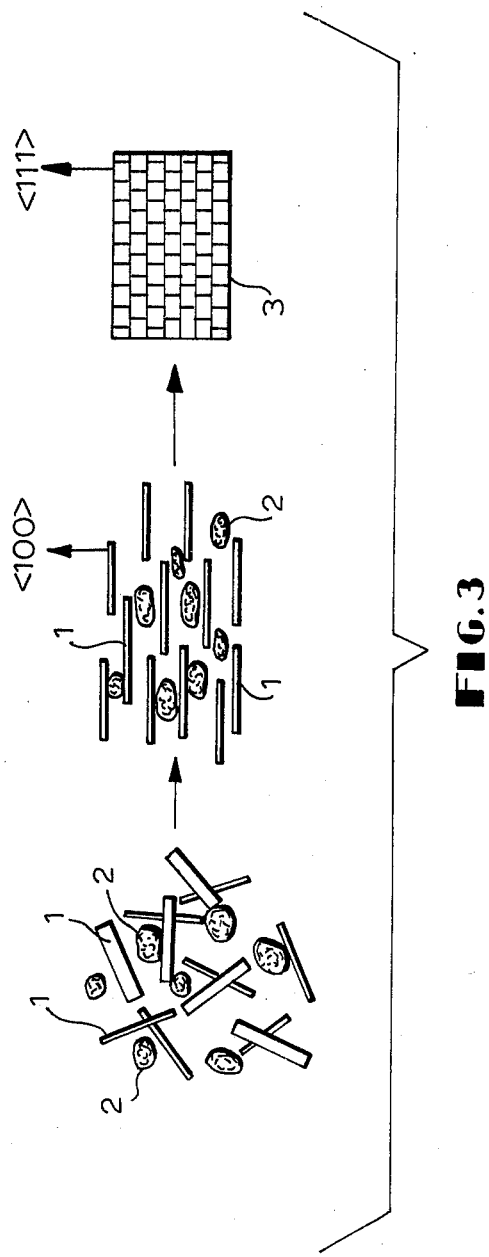
Figure 4:
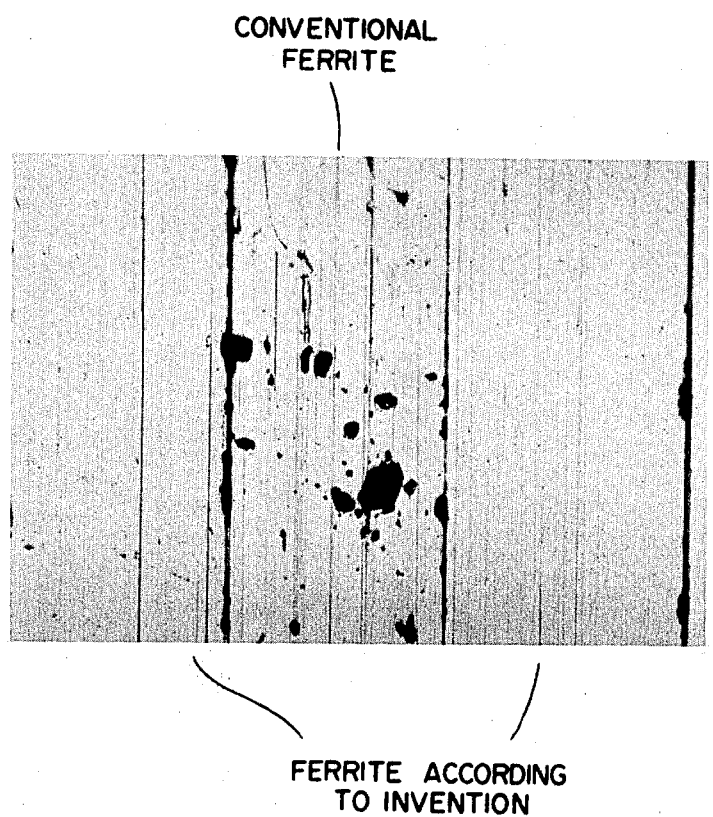

FIG. 3 is an idealized picture of how thin platelet particles orient themselves and transform to a crystal oriented polycrystalline ferrite body after heating (sintering); and FIG. 4 is a photograph showing the front surfaces of magnetic heads made of a crystal oriented polycrystalline ferrite body made by the method of this invention and of a magnetic head made of a conventional ferrite material, after 200 hours of normal operation of the magnetic heads using a magnetic tape containing $\gamma$-$Fe_2O_3$ particles.

In this application, the words "substantially oriented (111)-crystallographic planes" are to be understood as follows. "Substantially oriented (111)-crystallographic planes" means the (111)-crystallographic planes are oriented in a direction which can be analogized to a fiber axis. A material which has a texture like ones in this invention consists of crystallites each having one common crystallographic direction, the <111>-direction in this invention, substantially parallel to another common direction, analogous to a fiber axis, throughout the material. Since the ferrites in this invention crystallographically have a cubic structure and the eight crystallographic directions are exactly equivalent to the <111>-direction in the crystal structure, the <111>-direction is to be understood as being any one of the eight equivalent directions, and that direction and the direction opposite thereto are parallel to the axis analogous to the fiber axis and other six directions not parallel to the said axis.

In this application, the use of the words "fiber texture" and "fiber axis" is intentionally avoided since they are likely to give a false idea that the ferrite in this invention consists of bundle of fibers and the axes of the fibers coincide substantially with the fiber axis. It should be again noted that the ferrite in this invention is a ferrite body composed of crystallites which have the (111)-crystallographic planes thereof substantially oriented parallel with each other.

In accordance with this invention, a superior crystal oriented ferrite body can be manufactured with good productivity by the following steps: making a slurry of a starting material containing at least a powder of crystalline particles of a manganese compound (designated as MCP hereinafter) consisting essentially of thin platelets which have two substantially parallel major surfaces; orienting the major surfaces of the MCP in the slurry substantially in one direction; and heating (sintering) the thus treated material so as to obtain a crystal oriented ferrite body. Addition of ferrite constituents such as Fe, Co, Zn, Ni, Mg, Li and Cu other than the manganese compound is necessary during the step of making the slurry of the starting material and/or after the step or orienting the major surfaces of the MCP. When the ferrite constituents (designated as FCP hereinafter) are added, e.g. by mixing in, during the step of making the slurry of the starting material, the step of orientation yields a green oriented body. On the other hand, when the FCP is added after the step of orientation, the step of orientation only yields preliminarily oriented body, and a green oriented body is obtained only after the step of adding the FCP. The green oriented body is an oriented body of a mixture of MCP with FCP. A preferable amount of MCP in the resultant crystal oriented ferrite is more than 5% by weight. Various MCP's are heretofore known, and various methods to synthesize them are known. Examples of MCP's are: $\gamma$-MnOOH; $\beta$-MnO$_2$; $\alpha$-MnOOH; $\gamma$-MnO$_2$; $\beta$-MnOOH; $\delta$-MnOOH; and Mn(OH)$_2$. One method of synthesizing a $\gamma$-MnOOH powder is:

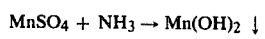

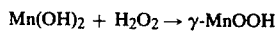

One method of synthesizing a $\beta$-MnO$_2$ powder is to prepare a solution of MnCl$_2$, KMnO$_4$ and KOH, and subject it to a hydrothermal treatment in an autoclave at a temperature e.g. of 250° C.

Figure 1A:
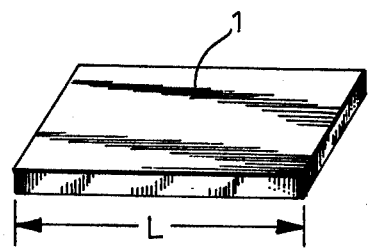
FIGS. 1A and 1B are schematic drawings of the ideal shapes of platelets of the material in this invention.
Figure 1B:
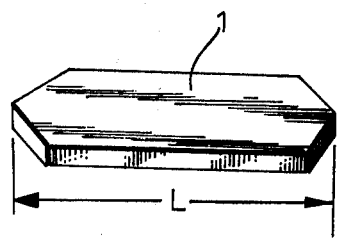

The MCP's substantially are thin platelets having shapes as shown in FIGS. 1A and 1B. The thin platelets are mostly either hexagonal thin plates, ribon-shape plates or stripe-shape plates. The word "thin platelet" means that the thickness dimension is far smaller than the other dimensions thereof, and two major surfaces 1 indicated in FIG. 1A or 1B are present. The length L shown in FIGS. 1A and 1B represents the grain size of the platelet.

Out of the seven MCP's set forth above, γ-MnOOH, β-MnO$_2$, α-MnOOH and γ-MnO$_2$ can be grouped (designated as group A hereinafter) bacause they ideally have a shape as shown in FIG. 1A, and the major surfaces of particles of group A correspond to the (100)-crystallographic planes of the corresponding cyrstal structure of the compounds, i.e. the two major surfaces are aligned in parallel with the (100)-crystallographic planes of the crystallographic structure of a particle of group A. β-MnOOH, δ-MnOOH and MN(OH)$_2$ can be grouped in a different group (group B) because they ideally have a shape as shown in FIG. 1B, and the major surfaces of particles of group B correspond to the (001)-crystallographic planes of the corresponding crystal structure of the compounds, i.e. the two major surfaces are aligned in parallel with the (001)-crystallographic planes of the crystallographic structure of a particle of group B. Both the crystallographic planes of these major surfaces, the (100)-planes and the (001)-planes, are transferred to (111)-crystallographic planes of cubic MnO and cubic α-Mn$_2$O$_3$ by heating the compounds at a temperature e.g. of about 700° C. in a vacuum and at a temperature e.g. of about 600° C. in air, respectively, Pyrolysis products, i.e. products obtained by pyrolysis, of the MCP's are also manganese compounds usable for this invention, i.e. such pyrolysis products are also members of the group of MCP's, if the pyrolysis treatment is carried out at a relatively low temperature, preferably at a temperature less than 900° C. In such a pyrolysis treatment, sintering of the MCP's does not take place, and the shape of the MCP's is preserved without severe deformation. Examples of the pyrolysis products of γ-MnOOH are successively βMnO$_2$, γMn$_2$O$_3$, Mn$_3$O$_4$, Mn$_5$O$_8$, α-Mn$_2$o$_3$ and MnO, i.e. the γ-Mn$_2$O$_3$ is the product of further pyrolysis of the β-MnO$_2$, the Mn$_3$O$_4$ is the product of further pyrolysis of γ-Mn$_2$O$_3$ etc. These pyrolysis products will hereinafter be called γ-MnOOH pp (for pyrolysis product) β-MnO$_2$, γ-MnOOHpp γ-Mn$_2$O$_3$, etc. Examples of the pyrolysis products of β-MnO$_2$ are in turn a slightly different γ-Mn$_2$O$_3$, Mn$_3$O$_4$, Mn$_5$O$_8$, and MnO, hereinafter called β-MnO pp γ-Mn$_2$O$_3$, β-MnO$_2$ pp Mn$_3$O$_4$, etc. Examples of the pyrolysis products of α-MnOOH are a further slightly different β-MnO$_2$, a γ-Mn$_2$O$_3$, Mn$_3$O$_4$, Mn$_5$O$_8$, α-Mn$_2$O$_3$ and MnO, hereinafter called α-MnOOH pp β-MnO$_2$, α-MnOOH pp γ-Mn$_2$O$_3$, etc.

Figure 2:
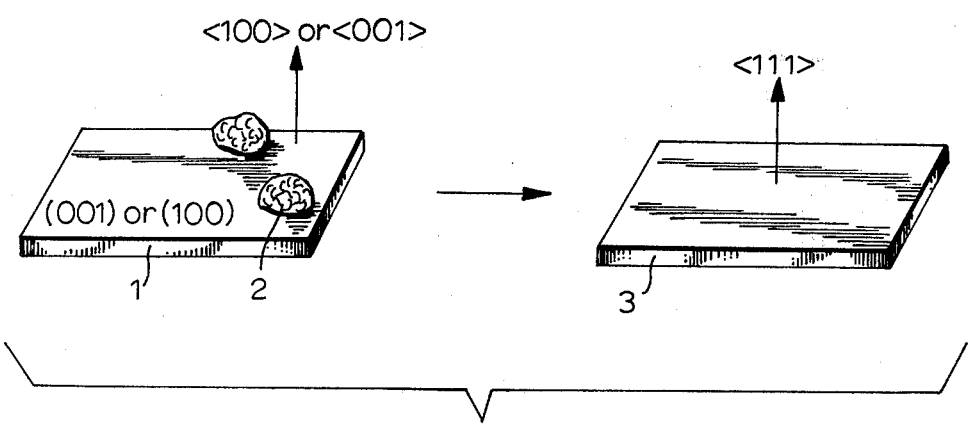
FIG. 2 shows an idealized transformation and a reaction of a thin platelet particle of a mangan compound and other ferrite constituents.

It has been found according to this invention that the crystallographic planes of the two major surfaces of a MCP are transferred to (111)-crystallographic planes of a cubic spinel ferrite material when, as shown in FIG. 2, a MCP particle 1 of group A or B and particles 2 of other FCP's react with each other and are transformed to a spinel ferrite 3 due to a topotactic reaction. It has been further found according to this invention that as shown in FIG. 3 the orientation can be carried out, for example, by precipitating a well dispersed MCP 1 and FCP 2 in a liquid and/or by cold-pressing the MCP 1 together with the FCP 2 by a uniaxial pressure, resulting in the production of a green oriented body, and that this green oriented body becomes a crystal oriented ferrite body composed of crystallites whose (111)-crystallographic planes orient substantially parallel with each other when it is sintered to a solid body. The transformation of the green oriented body to the crystal oriented ferrite body is presumably due to the above mentioned topotactic reaction. Most detailedly explaining the presumed mechanism, when MCP is heated in the sintering step, the MCP is decomposed, and metal ions of FCP 2 diffuse into the oriented MCP 1, thus yielding a crystal oriented ferrite body. To obtain superior orientation, it is desirable to have an average grain size of the MCP larger than 0.01 μ. The average grain size is a median of the biggest dimension of the platelet in FIGS. 1A or 1B. It is also desirable for superior orientation that the step of orientation be carried out by a uniaxial pressure preferably of more than 500 kg/cm$^2$ and/or by precipitating MCP powder (which can include FCP) in a liquid. The uniaxial pressure is preferably less than 3000 kg/cm$^2$ from a practical point of view although it is better to use higher pressure therefor. In the method according to this invention, a mixture of MCP and FCP is not necessarily prepared first. Instead, firstly a step of orienting MCP alone and secondly a step of impregnating the thus oriented MCP (preliminarily oriented body) with FCP followed by sintering also yields a crystal oriented ferrite body as set forth above. Impregnation of a preliminarily oriented body of MCP with FCP can be easily carried out e.g. by immersing the preliminarily oriented MCP body into a solution of salts of FCP so as to obtain a green oriented body. For obtaining a crystal oriented ferrite body having a very high degree of orientation, it is preferable to carry out the sintering step of the green oriented body at a temperature of above 1000°C., more preferably at a temperature of from 1100° C to 1450° C. so as to obtain a crystal oriented spinal ferrite body having an average grain size of more than 10 μ, preferably between 20 μ and 150 μ, which average grain size of the spinel ferrite body not only yields superior degree of orientation but also results in good magnetic characteristics. It has been also found that a dense well-oriented sintered ferrite body with good magnetic characteristics is obtained in an atmosphere of low oxygen partial pressure such as a vacuum and in an inert gas atmosphere. It has been further found that a dense well-oriented ferrite body with an extremely low porosity and superior magnetic characteristics is obtainable by hot-pressing the green oriented body by applying a uniaxial pressure in a direction coincides with a direction perpendicular to the substantially oriented major surfaces of the MCP.

The degree of orientation of the substantially oriented (111)-crystal planes is measured by an X-ray diffraction method, in which the substantially oriented (111)-crystal planes are exposed to FeK$_\alpha$ radiation, and defined by the following equation:

$$Q = \{I_{mmm}/I_{total} - \Gamma_{mmm}/\Gamma_{total}\}/\{1 - \Gamma_{mmm}/\Gamma_{total}\} \times 100 \, (\%)$$

where $I_{mmm} = \Sigma_h I(hhh)$, $I_{total} = \Sigma_{klm} I(klm)$, and $I(klm)$ and $I(hhh)$ indicate the integrated intensites of diffraction lines directed from the (klm)- and (hhh)-crystal planes, respectively, which give diffraction lines at a diffraction angle less than $2\theta = 85°$, and $\Gamma_{mmm}$ and $\Gamma_{total}$ indicate corresponding quantities of a homogeneous isotropic polycrystalline ferrite body.

A crystal oriented ferrite body thus obtained generally has a degree of orientation better than 20% and that obtained under the preferred conditions described above has a degree of orientation better than 40%. The material crumbling problem of the prior art ferrite heads is alleviated by employing the present (111)-crystallographic oriented polycrystalline ferrite as a magnetic head as seen in FIG. 4 and so is the problem with respect to wear characteristics. Furthermore, the operational life time of such a magnetic head was extremely prolonged. Due to the (111)-crystallographic orientation, an initial permeability within a plane of substantially oriented (111)-crystallographic planes was improved as shown by the following Examples.

The following are non-limitative illustrative examples of the preferred embodiments of this invention.

EXAMPLE 1

A slurry of a mixture of 0.352 kg of a γ-MnOOH powder and 0.712 kg of a αFeOOH powder was prepared by ball-milling it for 40 hours. The shape of the powder particles of the γ-MnOOH was a thin stripe shape having a grain size of about 10 μ(biggest dimension of the stripe) and a width (second biggest dimension of the stripe) of about 0.5μ. The two major surfaces of the γ-MnOOH powder particle corresponded to (100)-crystallographic planes. The shape of the powder particles of the α-FeOOH was also a thin stripe shape having a grain size of about 10 μ and a width of about 0.05 μ. The slurry was then compacted into a solid body which was a green oriented body, by a uniaxial pressure of 500 kg/cm$^2$ for squeezing out the liquid contained in the slurry. The green oriented body was then dried and sintered at a temperature of 1200° C. for 1 hour in a nitrogen atmosphere. The resultant manganese ferrite had a degree of orientation of about 90% and an initial permeability of about 3300 when measured within a plane of oriented (111)-crystallographic planes, and about 2400 when measured along the oriented <111>-crystallographic axis. For comparison, a manganese ferrite corresponding to a conventional ferrite was made in a manner substantially the same as that set forth above, except that in making the conventional ferrite, MnCO$_3$ and α-Fe$_2$O$_3$ were used as starting materials. The thus made conventional ferrite had the same stoichiometry as that of the ferrite set forth above and made in accordance with this invention. The thus made conventional ferrite had a magnetic permeability of about 2000.

EXAMPLE 2

An α-Fe$_2$O$_3$ powder of 0.640 kg which was obtained by calcining Fe$_2$SO$_4$ was substituted for the α-FeOOH powder used in Example 1. The average grain size of the α-Fe$_2$O$_3$ powder was about 0.5 μ. The obtained ferrite had a degree of orientation of about 60% and an initial permeability of 2600 when measured within a plane of oriented (111)-crystallographic planes.

EXAMPLE 3

Various manganese compounds were synthesized and used as a starting material as listed in Table 1. In the list, the shapes of the powder particles of the γ-MnOOH, β-MnO$_2$, α-MnOOH and γ-MnO$_2$ were as shown in FIG. 1A, while the shapes of the powder particles of β-MnOOH, δ-MnOOH and Mn(OH)$_2$ were as shown in FIG. 1B. Some of these manganese compounds were not pure and contained some other manganese compounds, for example, one β-MnOOH powder contained Mn(OH)$_2$ and γ-MnOOH particles. The particles of the α-FeOOH powder had a stripe shape having an average grain size of 10 μ, and the particles of the α-Fe$_2$O$_3$ powder had a substantially sperical shape having an average grain size as listed in Table 1.

These compounds were weighed in a ratio so as to obtain a MnFe$_2$O$_4$ ferrite compound and ball-milled for 40 hours. The obtained slurry was then pressed at the pressure indicated in Table 1 and sintered at a temperature of 1200° C. in a nitrogen atmosphere for 2 hours. Resultant orientations and grain sizes of the sintered bodies are listed in the last two columns of Table 1.

Table 1

| Sample No. | Mn Compound | Grain Size (μ) | Other Ferrite Constituents | Grain Size (μ) | Pressure (kg/cm$^2$) | Grain Size of Sintered Body (μ) | Orientation (%) |
|---|---|---|---|---|---|---|---|
| 1 | γ-MnOOH | 10 | α-FeOOH | 10 | 500 | 60 | 95 |
| 2 | γ-MnOOH | 10 | α-Fe$_2$O$_3$ | 0.5 | 500 | 50 | 60 |
| 3 | β-MnO$_2$ | 15 | α-FeOOH | 10 | 500 | 70 | 90 |
| 4 | β-MnO$_2$ | 15 | α-Fe$_2$O$_3$ | 0.6 | 500 | 30 | 40 |
| 5 | α-MnOOH | 10 | α-FeOOH | 10 | 500 | 70 | 95 |
| 6 | α-MnOOH | 10 | α-Fe$_2$O$_3$ | 0.3 | 500 | 50 | 70 |
| 7 | γ-MnO$_2$ | 5 | α-FeOOH | 10 | 1000 | 40 | 60 |
| 8 | γ-MnO$_2$ | 5 | α-Fe$_2$O$_3$ | 0.3 | 1000 | 15 | 30 |
| 9 | β-MnOOH | 5 | α-FeOOH | 10 | 1000 | 50 | 80 |
| 10 | β-MnOOH | 5 | α-Fe$_2$O$_3$ | 0.3 | 1000 | 20 | 40 |
| 11 | δ-MnOOH | 5 | α-FeOOH | 10 | 1000 | 50 | 50 |
| 12 | δ-MnOOH | 5 | α-Fe$_2$O$_3$ | 0.3 | 1000 | 15 | 30 |
| 13 | Mn(OH)$_2$ | 2 | α-FeOOH | 10 | 2000 | 60 | 60 |
| 14 | Mn(OH)$_2$ | 2 | α-Fe$_2$O$_3$ | 0.3 | 2000 | 10 | 20 |

EXAMPLE 4

A γ-MnOOH powder the particles of which has a thin stripe shape having an average grain size of about 15 μ was heat treated at temperatures and atmospheres indicated in Table 2. An α-FeOOH powder was used as a ferrite constituent just as in Example 3 for obtaining MnFe$_2$O$_4$ ferrite. The process used here was the same as the process used in Example 3, except that here the applied pressure was 2000 kg/cm$^2$ for all the samples listed in Table 2. The last two columns of Table 2 give the average grain sizes and the orientation of the resultant cyrstal oriented ferrite bodies.

Table 2

| Sample No. | Pyrolysis Products | Condition | Grain Size (μ) | Orientation (%) |
|---|---|---|---|---|
| 15 | β-MnO$_2$ | 150° C,air | 60 | 90 |

Table 2-continued

| Sample No. | Pyrolysis Products | Condition | Grain Size ($\mu$) | Orientation (%) |
|---|---|---|---|---|
| 16 | $Mn_5O_8$ | 450° C, air | 50 | 80 |
| 17 | $\alpha$-$Mn_2O_3$ | 600° C, air | 50 | 60 |
| 18 | $Mn_3O_4$ | 600° C, $N_2$ | 60 | 70 |
| 19 | MnO | 800° C, Vacuum | 30 | 50 |

EXAMPLE 5

A starting material comprising 0.170 kg of a $\beta$-$MnO_2$ powder obtained by heating a $\gamma$-MnOOH powder at a temperature of 150° C. in an ambient atmosphere, i.e. $\gamma$-MnOOH pp $\beta$—$MnO_2$, of an $\alpha$-$Fe_2O_3$ powder having an average grain size of about 0.8 $\mu$ and the particle shape which was spherical, and 0.162 kg of a ZnO powder having an average grain size of about 0.2 $\mu$ and a particle shape which was a thin platelet shape were prepared by mixing it in a well dispersed slurry. The original $\gamma$-MnOOH particles had a thin stripe shape and their average grain size was about 15 $\mu$. The slurry thus obtained was press-molded into a green oriented body by a uniaxial pressure of 2000 kg/cm². The green oriented body was then sintered at a temperature of 800°C. in a $N_2$ atmosphere for 1 hour, and then the sintered ferrite body was again pressed by a uniaxial pressure of 2000 kg/cm² in the same mold used for the previous pressing. The pressing direction in the case of the sintered ferrite body was the same as that of the pressure applied to the green oriented body. The thus treated sintered ferrite body was again sintered at a temperature of 1200° C. in a $N_2$ atmosphere to the final well sintered ferrite body. The orientation of the resultant crystal oriented ferrite body was about 70%.

EXAMPLE 6

A well dispersed slurry as prepared in Example 1 with additional water was allowed to settle for 48 hours. Water was quietly drained out, and the precipitated material was dried to yield a green oriented body. The green oriented body was then sintered at a temperature of 1200°C. for 1 hour in a $N_2$ atmosphere. The manganese ferrite thus obtained had the degree of orientation of about 70%.

EXAMPLE 7

Treatment similar to that of Example 6 was carried out here, except that here before the precipitated material was dried, a uniaxial pressure of 500 kg/cm² was additionally applied in a direction perpendicular to the top surface of the precipitated material, and the thus obtained green oriented body was sintered at a temperature of 1200° C. in a $N_2$ atmosphere for 1 hour. The resultant manganese ferrite body had the degree of orientation of about 95%.

EXAMPLE 8

A material the same as the green oriented material prepared in Example 6 was sintered at a temperature of 1200° C. in a vacuum for 1 hour. The obtained ferrite body had a degree of orientation of about 85%.

EXAMPLE 9

A material the same as the green oriented body obtained in Example 5 was hot-pressed at a temperature of 1200° C. at a pressure of 300 kg/cm² for 2 hours. The obtained crystal oriented ferrite body had a porosity of less than 0.1% and a degree of orientation of about 95%.

For checking the crumbling properties of the ferrite made in accordance with this invention and the ferrite made in accordance with the conventional method, two magnetic heads were made. One of them was made by using the ferrite in accordance with this invention in such a way that a front surface of the magnetic head was substantially parallel to the substantially oriented (111)-crystallographic planes. The other of the two magnetic heads was made by using the conventional ferrite. These two magnetic heads were rubbed by a $\gamma$-$Fe_2O_3$ tape running at a relative speed of 12 m/s. After 200 hours of testing, the surfaces of the heads were observed and photographed as shown in FIG. 4. Thus, it was found that the problem of material crumbling of prior art ferrites was alleviated by employing a (111)-crystallographic oriented polycrystalline ferrite; that wear characteristics were also improved according to this invention; and that the operational life time of the magnetic heads was greatly prolonged according to this invention.

EXAMPLE 10

Various green oriented bodies were prepared by using various pressures as listed in Table 3 and using a slurry as produced in Example 1. They were sintered at a temperature of 1200° C. in $N_2$ atmosphere to yield crystal oriented manganese ferrites. It can be seen from the Table 3 that the effect of the magnitude of uniaxial pressure tends to saturate at high pressure and that a pressure of about 500 kg/cm² to 3000 kg/cm² is sufficient from a practical standpoint.

Table 3

| Pressure (kg/cm²) | Orientation (%) |
|---|---|
| 100 | 70 |
| 300 | 80 |
| 500 | 90 |
| 1000 | 90 |
| 3000 | 95 |
| 5000 | 98 |

EXAMPLE 11

A well dispersed slurry of $\gamma$-MnOOH powder the articles of which had a shape as described in Example 1 was allowed to settle for 48 hours. Water was quietly drained out, and the precipitated material was dried to yield an oriented material (preliminarily oriented material) composed of $\gamma$-MnOOH powder. The preliminarily oriented material in the form of a body was immersed in a $FeCl_3$ solution so as to impregnate the preliminarily oriented body with Fe and to yield a green oriented body. The green oriented body was sintered at a temperature of 800° C. in an ambient atmosphere for one hour and was substantially subjected to sintering at a temperature of 1200° C. in a $N_2$ atmosphere. The manganese ferrite thus obtained had a degree of orientation of about 75%.

What we claim is:

1. A method of making a polycrystalline Mn containing ferrite body, comprising the steps of: providing a manganese compound, the particles of which are thin platelets which have substantially parallel major surfaces; shaping into a body a mixture comprising at least 5% by weight of said manganese compound and more than 50% by weight of spinel ferrite constituents selected from the group consisting of Fe, Co, Zn, Ni, Mg, Li and Cu with said parallel major surfaces being oriented substantially in one direction in said body of said mixture; and sintering said body of said mixture at a temperature of from 1000° to 1450° C. thereby converting said body into a polycrystalline Mn containing ferrite body of a spinel structure consisting essentially of crystallites which have the (111)-crystallographic planes thereof substantially oriented parallel with each other.

2. A method according to claim 1 wherein said manganese compound is a $\gamma$-MnOOH powder, the particles of which have two major surfaces aligned in parallel with the (100)-crystallographic planes of the crystallographic structure of $\gamma$-MnOOH or a pyrolysis product of said $\gamma$-MnOOH powder selected from the group consisting of $\gamma$-MnOOH pp $\beta$-MnO$_2$ powder, $\gamma$-MnOOH pp $\gamma$-Mn$_2$O$_3$ powder, $\gamma$-MnOOH pp M$_3$O$_4$ powder, $\gamma$-MnOOH pp Mn$_5$O$_8$, $\gamma$-MnOOH pp $\alpha$-Mn$_2$O$_3$ powder and $\gamma$-MnOOH pp MnO powder.

3. A method according to claim 1 wherein said manganese compound is a $\beta$-MnO$_2$ powder, the particles of which have two major surfaces aligned in parallel with the (100)-crystallographic planes of the crystallographic structure of $\beta$-MnO$_2$, or a pyrolysis product of said $\beta$-MnO$_2$ powder selected from the group consisting of $\beta$-MnO$_2$ pp $\gamma$-Mn$_2$O$_3$ powder, $\beta$-MnO$_2$ pp Mn$_3$O$_4$ powder, $\beta$-MnO$_2$ pp Mn$_5$ O$_8$ powder, $\beta$-MnO$_2$ pp $\alpha$-Mn$_2$O$_3$ powder and $\beta$-MnO$_2$ pp MnO powder.

4. A method according to claim 1 wherein said manganese compound is an $\alpha$-MnOOH powder, the particles of which have two major surfaces aligned in parallel with the (100)-crystallographic planes of the crystallographic structure of $\alpha$-MnOOH, or a pyrolysis product of said $\alpha$-MnOOH powder selected from the group consisting of $\alpha$-MnOOH pp $\beta$-MnO$_2$ powder, $\alpha$-MnOOH pp $\gamma$-Mn$_2$O$_3$ powder, $\alpha$-MnOOH pp Mn$_3$O$_4$ powder, $\alpha$-MnOOH pp Mn$_5$O$_8$ powder, $\alpha$-MnOOH pp $\gamma$-Mn$_2$O$_3$ powder, and $\alpha$-MnOOH pp MnO powder.

5. A method according to claim 1 wherein said manganese compound is a $\gamma$-MnO$_2$ powder, the particles of which have two major surfaces aligned in parallel with the (100)-crystallographic planes of the crystallographic structure of $\gamma$-MnO$_2$, or a pyrolysis product of said $\gamma$-MnO$_2$ powder selected from the group consisting of $\gamma$-Mn$_2$O$_3$, Mn$_3$O$_4$, Mn$_5$O$_8$, $\alpha$-Mn$_2$O$_3$ and MnO.

6. A method according to claim 1 wherein said manganese compound is a $\beta$-MnOOH powder, the particles of which have two major surfaces aligned in parallel with the (001)-crystallographic planes of the crystallographic structure of $\beta$-MnOOH, or a pyrolysis product of said $\beta$-MnOOH powder selected from the group consisting of $\beta$-MnO$_2$, $\gamma$-Mn$_2$O$_3$, Mn$_3$O$_4$, Mn$_5$O$_8$, $\alpha$-Mn$_2$O$_3$ and MnO.

7. A method according to claim 1 wherein said manganese compound is a $\delta$-MnOOH powder, the particles of which have two major surfaces aligned in parallel with the (001)-crystallographic planes of the crystallographic structure of $\delta$-MnOOH, or a pyrolysis product of said $\delta$-MnOOH powder selected from the group consisting of $\beta$-MnO$_2$, $\gamma$-Mn$_2$O$_3$, Mn$_3$O$_4$, Mn$_5$O$_8$, $\alpha$-Mn$_2$O$_3$ and MnO.

8. A method according to claim 1 wherein said manganese compound is a Mn(OH)$_2$ powder, the particles of which have two major surfaces aligned in parallel with the (001)-crystallographic planes of the crystallographic structure of Mn(OH)$_2$, or a pyrolysis product of said Mn(OH)$_2$ powder selected from the group consisting of $\beta$-MnO$_2$, $\gamma$-Mn$_2$O$_3$, Mn$_3$O$_4$, Mn$_5$O$_8$, $\alpha$-Mn$_2$O$_3$ and MnO.

9. A method according to claim 8, wherein said shaping step further comprises cold-pressing said manganese compound under a uniaxial pressure of from 500–3000 kg/cm$^2$.

10. A method according to claim 1, wherein said shaping comprises orienting the major surfaces of said thin platelets by cold-pressing said manganese compound under a uniaxial pressure of from 500–3000 kg/cm$^2$.

11. A method according to claim 1, wherein said step of sintering is carried out at a temperature of from 1100° C. to 1450° C.

12. A method according to claim 1, wherein said step of sintering is carried out in a vacuum.

13. A method according to claim 1 wherein said step of sintering is carried out in an inert gas.

14. A method according to claim 1, wherein said shaping comprises forming a preliminarily oriented body of said manganese compound and impregnating said preliminarily oriented body with said ferrite constituents.

15. A method according to claim 1 wherein said step of sintering is carried out by hot-pressing.

16. A method of making a polycrystalline Mn containing ferrite body, comprising the steps of: providing a manganese compound of $\gamma$-MnOOH, the particles of which are thin platelets which have substantially parallel major surfaces, shaping into a body a mixture comprising at least 5% by weight of said manganese compound with more than 50% by weight spinel ferrite constituents taken from the group consisting of Fe, Co, Zn, Ni, Mg, Li and Cu, with said major parallel surfaces oriented substantially in one direction in said body of said mixture by cold-pressing with a uniaxial pressure; sintering said body of said mixture in an inert atmosphere at a temperature of 1000° to 1450° C. for converting said body into a polycrystalline Mn containing ferrite body of a spinel structure consisting essentially of crystallites which have the (111)-crystallographic planes thereof substantially oriented parallel with each other.

17. A method according to claim 16 wherein the particles of said $\gamma$-MnOOH powder have two major surfaces aligned in parallel with the (100)-crystallographic planes of the crystallographic structure of $\gamma$-MnOOH.

18. A method according to claim 16 wherein said uniaxial pressure is from 500 kg/cm$^2$ to 3000 kg/cm$^2$.

19. A method according to claim 16 wherein said step of sintering is carried out at a temperature of from 1100° C. to 1450° C.

20. A method according to claim 16, wherein said shaping comprises forming a preliminarily oriented body of said manganese compound and impregnating said preliminarily oriented body with said ferrite constituents.

21. A method according to claim 16, wherein said step of sintering is carried out by hot-pressing.

* * * * *